United States Patent [19]

Hale et al.

[11] Patent Number: 4,806,270

[45] Date of Patent: Feb. 21, 1989

[54] STAIN-RESISTANT ANTIMONY ORGANIC SULFUR-CONTAINING COMPOUNDS AND VINYL HALIDE RESINS CONTAINING SAME

[75] Inventors: Ronald G. Hale, Grove, Okla.; Thomas R. Woodley, Concord; Paul K. Tornstrom, Chagrin Falls, both of Ohio

[73] Assignee: Synthetic Products Company, Cleveland, Ohio

[21] Appl. No.: 11,640

[22] Filed: Feb. 6, 1987

[51] Int. Cl.$^4$ ............................................. C09K 15/32
[52] U.S. Cl. ................................ 252/400.54; 524/159; 524/177; 260/380
[58] Field of Search ................. 252/400.54; 524/157, 524/158, 177, 255

[56] References Cited

U.S. PATENT DOCUMENTS

| | | |
|---|---|---|
| 2,306,731 | 12/1942 | Hulse . |
| 2,419,405 | 4/1947 | Klein ................................... 524/380 |
| 2,476,821 | 7/1949 | Albert . |
| 2,556,420 | 6/1951 | Fincke . |
| 2,680,726 | 6/1954 | Weinberg et al. . |
| 2,684,956 | 7/1954 | Weinberg et al. . |
| 2,921,917 | 1/1960 | Longman . |
| 2,934,548 | 4/1960 | Fath . |
| 3,340,285 | 9/1967 | Remes et al. . |
| 3,367,954 | 2/1968 | Leebrick et al. . |
| 3,399,220 | 8/1968 | Remes et al. . |
| 3,432,534 | 3/1969 | Remes et al. . |
| 3,466,261 | 9/1969 | Mauz . |
| 3,504,005 | 3/1970 | Moedritzer et al. . |
| 3,530,158 | 9/1970 | Leebrick et al. . |
| 3,658,755 | 4/1972 | Moon et al. ......................... 524/159 |
| 3,829,286 | 8/1974 | Anzai et al. ....................... 260/380 X |
| 3,845,081 | 10/1974 | Kienzle et al. ................. 260/380 X |
| 3,887,508 | 6/1975 | Dieckmann . |
| 3,928,396 | 12/1975 | Kishi et al. ....................... 260/380 X |
| 4,010,104 | 3/1977 | Radlmann et al. . |
| 4,029,618 | 6/1977 | Dieckmann ......................... 524/177 |
| 4,033,923 | 7/1977 | Tsujimoto et al. ............. 524/159 X |
| 4,038,198 | 7/1977 | Wagner et al. ..................... 252/182 |
| 4,115,352 | 9/1978 | Bohen et al. . |
| 4,126,626 | 11/1978 | Jost .................................. 260/380 X |
| 4,158,640 | 6/1979 | Dieckmann ..................... 252/400 R |
| 4,217,258 | 8/1980 | Minagawa et al. . |
| 4,221,687 | 9/1980 | Minagawa et al. ................. 524/114 |
| 4,231,895 | 11/1980 | Dworkin . |
| 4,256,618 | 3/1981 | Brecker et al. . |
| 4,269,731 | 5/1981 | Mack . |
| 4,279,806 | 7/1981 | Muldrow . |
| 4,279,807 | 7/1981 | Dworkin . |
| 4,287,118 | 9/1981 | Muldrow, Jr. . |
| 4,327,000 | 4/1982 | Muller et al. . |
| 4,336,168 | 6/1982 | Hoch et al. . |
| 4,344,767 | 11/1982 | Umsonst et al. .................... 524/159 |
| 4,361,665 | 11/1982 | Miller et al. . |
| 4,367,304 | 1/1983 | Michaelis et al. ................... 524/204 |
| 4,381,360 | 4/1983 | Leistner et al. ..................... 524/178 |
| 4,391,757 | 7/1983 | Kugele et al. . |
| 4,394,325 | 7/1983 | Bresser et al. . |
| 4,396,552 | 8/1983 | Knobloch et al. . |
| 4,416,797 | 11/1983 | Minagawa et al. ............. 252/400 A |
| 4,440,674 | 4/1984 | Dieckmann et al. . |
| 4,440,891 | 4/1984 | Taylor et al. . |

FOREIGN PATENT DOCUMENTS

2345124 3/1975 Fed. Rep. of Germany ...... 524/159

OTHER PUBLICATIONS

Windholz et al. (Eds.), *The Merck Index*, Tenth Edition (1983), Merck & Co., Inc., Rahway, NJ, pp. 627–628.

*Primary Examiner*—Matthew A. Thexton
*Attorney, Agent, or Firm*—Wood, Herron & Evans

[57] ABSTRACT

Stain-resistant antimony organic sulfur-containing compositions are disclosed. A stain-resistant additive, particularly a soluble organic violet dye is included in liquid antimony compositions and such compositions are storage stable. The normally liquid antimony compositions provide effective heat stabilization in vinyl halide resins and resistance to staining associated with such sources as cross-staining, titanium dioxide and ultraviolet light.

32 Claims, No Drawings

STAIN-RESISTANT ANTIMONY ORGANIC SULFUR-CONTAINING COMPOUNDS AND VINYL HALIDE RESINS CONTAINING SAME

RELATED APPLICATION

This application is a continuation-in-part of application Ser. No. 740,513, filed Jun. 3, 1985, now U.S. Pat. No. 4,642,200.

BACKGROUND OF THE INVENTION

Antimony mercaptides have been proposed as stabilizers for vinyl halide resins to guard against degradation by heat during molding and working of the resins into useful articles. Prior art patents which disclose such antimony organic sulfur-containing compounds and their utility as stabilizers include U.S. Pat. Nos. 2,680,726; 2,684,956; 3,340,285; 3,399,220; 3,466,261 and 3,530,158. U.S. Pat. No. 3,887,508 is directed to improvements in the utilization of antimony organic sulfur-containing compounds in combination with metal carboxylates. As also described in U.S. Pat. No. 3,919,168, certain metal phosphates can be combined with antimony compounds to achieve long term heat stability improvements in vinyl halide resins. U.S. Pat. Nos. 4,029,618 and 4,158,640 further disclose synergistic heat stabilizer compositions of such antimony compounds as stabilizers and ortho-dihydric phenols. More recently in U.S. Pat. No. 4,440,674, improved antimony stabilizers were disclosed for the prevention of resin degradation by heat and shear.

As an overview to the patent technology in the area of antimony compositions in general, a number of patents have issued including: U.S. Pats. Nos. 2,306,731; 2,476,821; 2,556,420; 2,921,917; 2,934,548; 3,367,954; 3,432,534; 3,504,005; 4,010,104; 4,038,198; 4,115,352; 4,217,258; 4,221,687; 4,231,895; 4,256,618; 4,269,731; 4,279,806; 4,279,807; 4,287,118; 4,327,000; 4,336,168; 4,361,665; 4,367,304; 4,381,360; 4,391,757; 4,394,325; 4,396,552; 4,416,797 and 4,440,891. These patents demonstrate the field of antimony compounds or compositions in general and there is no intention by listing them in this group that they are all relevant to a person of ordinary skill in this art as background to this invention. Nevertheless, they are offered herewith in keeping with the duty of candor so that an independent determination may be made.

Notwithstanding the substantial amount of effort that has been directed to improvements in the art of antimony compositions especially suited for the heat stabilization of vinyl halide resins, a number of problems still remain. The problems that remain may be described as generally relating to the propensity of such antimony compounds to somehow cause staining in a vinyl halide resin upon the application of heat. For instance, a compounded polyvinylchloride resin (PVC) containing an antimony stabilizer with the usual additives such as pigments, lubricants, and the like will stain during processing. Staining, as the term is understood in the trade, is the propensity of the white pigmented PVC formulation to turn slightly yellow or off-white. Presently, molded or extruded potable pipes that are made with such PVC formulations containing antimony stabilizers usually are slightly or moderately stained, depending upon processing conditions. The staining is believed to be attributable to a number of causes. For instance, antimony sulfides may be formed during the course of the processing and they may contribute to a yellow color in the compounded resin. Furthermore, it has been observed that antimony stabilizers produce staining in compounded PVC which has been pigmented with certain types of $TiO_2$. Ultraviolet light is also known to stain molded PVC articles which have been made with antimony heat stabilizers. Another staining problem is believed attributable to a phenomenon known as "cross-staining" wherein an antimony compound will react with residual sulfides that may be present due to residual amounts of organo tin compounds left in the compounding equipment or molding dyes. The antimony sulfides thus produced by cross-staining present an unattractive staining or yellowing of the molded part. Thus, staining attributable to any one of a number of the above causes has made antimony stabilizer compositions less attractive at times than competitive materials in the marketplace such as tin heat stabilizers for PVC resins.

SUMMARY OF THE INVENTION

This invention is directed to a stain-resistant antimony organic sulfur-containing composition. The invention is also directed to vinyl halide resin compositions containing a stain-resistant antimony organic sulfur-containing composition. It has been found that staining problems discussed in the background of this invention are largely minimized or eliminated by the antimony compositions of this invention having a stain-resistant additive contained therein.

More particularly, an antimony organic sulfur-containing compound containing, as a stain-resistant additive, a soluble organic violet dye has been found to largely eliminate or materially reduce the staining problems associated with, for example, cross-staining, certain grades of $TiO_2$, and ultraviolet light. Vinyl halide resin compositions containing an antimony organic sulfur-containing compound and, as a stain-resistant additive in an effective amount, a soluble organic violet dye have been found to resist staining otherwise normally encountered in such compositions. Other organic violet dyes may be employed as the anti-staining additive.

Normally liquid antimony organic sulfur-containing compounds having, as a stain-resistant additive in an effective amount, the violet dye solubilized in the liquid composition are also provided by this invention. It has been found that such normally liquid antimony compositions are shelf stable and upon use provide effective heat stabilization and resistance to staining otherwise associated with cross-staining, certain grades of $TiO_2$, heat, ultraviolet light, or the like.

Broad ranges of components of the antimony compound and the anti-staining additive can be employed in this invention. Particularly useful anti-staining antimony compositions of this invention are achieved by an antimony composition containing on the order of about 0.02 to about 0.10% by weight of the anti-staining additive in the composition. More usually, about 0.03 to 0.05% by weight is employed. There are also certain generally preferred weight ratios of the antimony organic sulfur-containing compound containing the anti-staining additive when such a composition is employed as a stabilizer for a vinyl halide resin composition. Particularly useful antimony stabilizer compositions of the invention are achieved with a total parts by weight range on the order of about 0.2 to about 10 parts by weight of the antimony stabilizer per 100 parts by weight (PHR) of a vinyl halide resin, preferably on the order of about 0.5 to about 5 parts. Useful ranges of components in such compositions will become more apparent in view of the detailed operating examples. For a further understanding of each of the components including the antimony organic sulfur-containing compounds, anti-staining additives, and vinyl halide resin stabilized compositions containing such components, reference is made to the following detailed description.

ANTIMONY ORGANIC SULFUR-CONTAINING COMPOUND

The antimony organic sulfur-containing compounds which are of use in this invention are generally characterized as having the Sb-S group or linkage. Generally, most antimony organic compounds suitable for use in this invention are derived from trivalent antimony and include mercaptides which may be characterized by the following formula:

Formula I: $Sb(SR)_3$ wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., decyl or dodecyl mercaptan are usually preferred because the lower mercaptans are undesirable for the preparationaand use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylene glycol, and others may be mentioned. Specific examples of such antimony mercaptides are antimony trilaurylmercaptide, antimony triphenylmercaptide and antimony tribenzylmercaptide. Patents exemplifying this formula $Sb(SR)_3$ or a similar formula and a definition of compounds represented thereby include U.S. Pat. Nos. 2,684,956 and 3,466,261, among others.

Antimony organic sulfur-containing compounds other than the antimony mercaptides of the Formula I above, are suitable for use according to this invention. Such compounds are generally termed antimony mercaptoacid esters which may be further defined by the following formula:

Formula II. $Sb(SRCOOR')_3$ wherein R is selected from the group consisting of alkylene, arylene, and aralkylene radicals and R' is a substituted or unsubstituted alkyl, aryl or mixed arylalyl group. Thus R may be derived from mercapto acetic, α-mercaptopropionic, thiomalic, thiosalicyclic acids, etc. Similarly, R' may be derived from decanols, glycerol, glycol, monoesters, dihydroabietyl alcohol, phenoxyethanol, pentaerythritol, etc. Readily available mercaptoacid esters are the esters of thioglycolic acid such as ethyl thioglycolate, isooctylthioglycolate, and generally the esters of mono and dibasic aliphatic and aromatic mercapto acids, such as esters of α-thiopropionic acid, thiolactic acid, thiobutyric acid and mercaptolauric acid. Specific examples of antimony mercaptoacid esters include antimony tris(isooctylthioglycolate), antimony tris(glycoldimercaptoacetate), antimony tris(dodecylthioglycolate), dodecylmercaptoantimony bis(isooctylthioglycolate), and antimony tris(isooctyl-α-mercaptopropionate).

Particularly suitable are the esters of mercapto alcohols, which are included in the above generalized formula and further defined by the more specific formula $Sb-S-(CH_2)_x-OOCR$ where x is an integer, such as thioglycols, in which the hydroxy groups are esterified by an aliphatic aromatic or alicyclic saturated or unsaturated monocarboxylic or dicarboxylic acid. Patents exemplifying Formula II, the above specific formula, or a similar formula, and a definition of compounds represented thereby include U.S. Pat. Nos. 2,680,726 and 3,530,158, among others.

The antimony organic sulfur-containing compounds having the Sb-S group represented by Formulas I and II come within the scope of a broader characterization illustrated by the following formula:

Formula III. $R_nSbX_{3-n}$ wherein R is selected from the group consisting of alkyl, alkenyl, alkynyl, aryl, cycloalkyl, cycloalkenyl, and mixed aryl-alkyl, and substituted groups thereof, where X is selected from the group consisting of sulfide (sulfur) or mercaptide and n is an integer of 0 to 2. Of course, other X groups are SR and SRCOOR' defined by Formulas I and II above wherein R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof. This is also apparent, and with reference to the above incorporated U.S. Pat. No. 3,530,158, that when X is divalent, e.g., sulfide, the compound may be RSbX as exemplified hereinafter by n-butyl antimony sulfide where n or $R_n$ in Formula III is 1 and where n of $X_{3-n}$ is 2. It is therefore appreciated that the formulas wherein are merely representative indicia of the class of antimony compounds which respond to the teachings of this invention. In the compounds, $R_nSbX_{3-b}$ which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e., allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phenylethynyl, ethynyl, etc. Typical aryl groups which may be employed may include phenyl, tolyl, xylyl, chlorophenyl, dimethylaminophenyl, etc. Where more than one R or X is present in Formula III, such groups may be the same or different. Typical mercaptides include phenyl mercaptide, lauryl mercaptide, butyl mercaptide, or dimercaptides including aliphatic, cycloaliphatic, or aromatic dimercaptans of the R groups disclosed herein, etc. Specific compounds when n is 1 or 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifying such antimony compounds include U.S. Pat. Nos. 3,530,158 and 3,399,220. Where the R group is aryloxyl, alkyloxy, alkaryloxy, acyloxy, etc., specific examples from which this group is derived may include 2-ethylhexanol, phenol, nonylphenol, xylenol, 2-ethylhexoic acid, oleic acid, lauric acid, benzoic acid and the like. Of course, it is apparent that antimony mercaptides, antimony mercapto acids, antimony mercaptoacid esters, etc., per se form no part of this invention and the mentioned patents and their specific disclosures clearly teach these compounds and their method of production to enable anyone of ordinary skill to use them in carrying out this invention.

ANTI-STAINING ADDITIVE

An anti-staining additive according to the principles of this invention may be characterized as an organic violet dye which is soluble or compatible in the antimony stabilizer formulations. Thus, the organic violet dye may be soluble in the antimony stabilizer or insoluble so long as it is compatible to achieve the benefits of anti-staining activity according to this invention. In this broadest sense, therefore, it has been found that an organic violet dye may be used as the anti-staining additive. Other apparently similar colored organic dyes or similar compounds do not provide the desired anti-staining activity. Thus, according to the findings of this invention, it is an erroneous oversimplification to conclude that the staining problems of the prior art may be solved by simply coloring the stock components. The examples which follow will support this position. In a preferred form, normally liquid antimony compositions containing the anti-staining additive are provided. The most preferred organic violet dye of this invention is D&C Violet No. 2, also known as Alizurol Purple SS; CI Solvent Violet 13(60725). The CAS registration number is 81-48-1. It is commonly known as 1-hydroxy-4-[(4-methylphenyl)amino]-9,10-anthracenedione. Such dyes may also aptly be described as hydroxy arylaminoanthraquinones. The process for preparing the 1-hydroxy 4-arylaminoanthraquinone is disclosed in U.S. Pat. No. 2,419,405, issued 1943, and its disclosure is incorporated herein by reference. Particular reference is made to Example 8 wherein quinizarin is condensed with p-toluidine to produce 1-hydroxy-4-p-toluidinoanthraquinone. Alternatively, 1-hydroxy-4-halogenoanthraquinone may be condensed with p-toluidine. Another organic violet dye is crystal violet, otherwise known as gentian violet or methylrosanaline chloride. This dye is a derivative of pararosanaline, a triphenylmethane type of dye.

It has also been found that normally liquid antimony organic sulfur-containing compounds which contain the solubilized D&C Violet No. 2 produce the unique anti-staining results. Therefore, useful anti-staining liquid antimony compositions are provided by this invention and such have been found to be shelf-stable. Further, vinyl halide resins stabilized therewith have been found to provide products resistant to staining from various sources. Surprisingly, it has been found that apparently similar dyes or chemical compounds will not provide the anti-staining characteristics of the additives of this invention.

The principles of this invention and operating parameters will be further understood with reference to the following detailed examples which serve to illustrate the types of specific materials and their amounts as used in typical vinyl halide resin formulations and the desired results displayed by the essential combination of components in the anti-staining organic antimony compositions according to this invention. These examples are considered to be exemplary of this invention, and should not be considered as limiting, especially in view of applicants' broad disclosure of the principles of this invention.

DETAILS OF EXEMPLIFICATION

In the examples which follow, a standard resin formula was employed with contained 200 parts by weight of polyvinylchloride homopolymer which is characterized as a white powder. Included in this standard resin formula are also 2 parts of $TiO_2$ (either R-101 or HiTox, as the case may be) which is a pigment. R-101 is a pigment which does not cause staining wherein HiTox does exhibit such a propensity. Calcium carbonate is employed as a filler on the order of about 10 parts by weight. Calcium stearate was also employed at 1.4 parts by weight. The resin formula also contained 2.4 parts by weight of 165° wax and 0.3 parts by weight of polyethylene wax. The term "standard resin blank" or "blank" is used hereinafter in these examples to designate the standard resin formula without the anti-staining or antimony stabilizer additives.

Various combinations of the antimony organic sulfur-containing compounds and a phenolic stabilizer, such as a catechol, were first blended together to form a shelf stable liquid in accordance with the teachings of U.S. Pat. Nos. 4,029,618 or 4,158,640. Specifically, t-butylcatechol was employed as a stabilizing phenol in a liquid antimony tris-isooctylthioglycolate (hereinafter ATG) on the basis of about 5% by weight of the antimony compound.

Other phenolic stabilizers or antioxidants may be employed following the teachings of U.S. Pat. Nos. 4,029,618 or 4,158,640. The terms "phenol" and "phenols" as used herein are intended to include mono- or polynuclear phenols exemplified by the benzene or naphthalene nucleus and alkyl substituted forms of such nucleus. Mono-, di- or trihydric phenols are also suitable for use in accordance with this invention. Such phenols may also be functionally substituted. Alkyl substituted groups of mono- or polynuclear phenols of this formula include straight or branched chain groups of Carbon, such as methyl, ethyl, propyl, pentyl, hexyl, heptyl, dodecyl, or tertiary butyl, isopropyl, etc. forms. In addition, mercapto-phenolic compounds may be employed of the type disclosed in U.S. Pat. No. 4,440,891. Such compounds include one or more hydroxyl groups on the aromatic ring and one or more mercapto groups. Certain preferred synergistic heat stabilizing activities may be achieved in accordance with the disclosure of U.S. Pat. Nos. 4,029,618 and 4,158,640, and such disclosure is incorporated herein by reference. In accordance with the teachings of this invention, in one of its aspects it is also preferred to use an antioxidant such as 2,6-di-t-butyl-4-methyl phenol, commonly known as butylated hydroxy toluene (BHT).

To the liquid ATG sample prepared in accordance with the above technique, various dyes or compounds on the order of about 0.23 gram per pound of ATG (about 0.05% by weight) were added with slight heating to about 160° F. Each of the organic dyes is identified in the following Table I:

TABLE I

1. Aakash Chemicals & Dye-Stuffs, Inc. FD&C Blue No. 1 (hereinafter "Aakash FD&C Blue No. 1")
2. Aakash Chemicals & Dye-Stuffs, Inc. FD&C Blue No. 2 (hereinafter "Aakash FD&C Blue No. 2")
3. Aakash Chemicals & Dye-Stuffs, Inc. D&C Violet No. 2 (hereinafter "Aakash D&C Violet No. 2")
4. Colorcon Inc. Lot #AC-9909 FD&C Aluminum Lake, FD&C Blue No. 2 (hereinafter "Colorcon FD&C Blue No. 2")
5. Crompton & Knowles Corp. FD&C Blue No. 1 51-271100-0 AB8416 (hereinafter "Crompton FD&C Blue No. 1")
6. Crompton & Knowles Corp. FD&C Blue No. 2 51-271150-00 AB7044 (hereinafter "Crompton FD&C Blue No. 2")
7. Crompton & Knowles Corp. Ext. D&C Violet No. 2 54-276315-00 1B-0595 (hereinafter "Crompton Ext. D&C Violet No. 2")
8. I.T.C. Flavor & Fragrance Division 721070 FD&C Blue No. 1 (hereinafter "I.T.C. FD&C Blue No. 1")
9. I.T.C. Flavor & Fragrance Division 76020 FD&C Blue No. 2 (hereinafter "I.T.C. FD&C Blue No. 2")
10. Hkohnstamm K7116 Ext. D&C Violet No. 2 2B1367 (hereinafter "Hkohnstamm D&C Violet No. 2")
11. Pylam Products Company Inc. Pyla-Cert D&C Violet No. 2 (hereinafter "Pylam D&C Violet No. 2")
12. Pylam Products Company Inc. Pyla-Cert D&C Red No. 17 (hereinafter "Pylam D&C Red No. 17")
13. American Cyanamid Company Calco Oil Violet ZIRS, D&C Violet No. 2 (hereinafter "Calco D&C Violet No. 2")

The chemical names and the structual formulas for each of the above certified colors or colorants are:

FD&C Blue No. 1

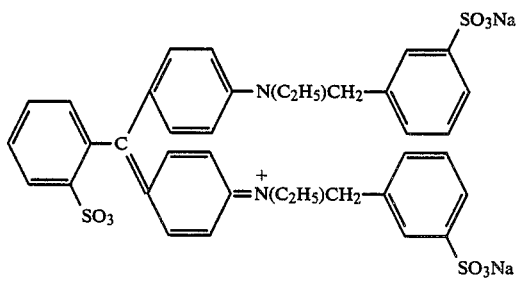

principally the disodium salt of ethyl[4-p-[ethyl(m-sulfobenzyl)amino]-α-(o-sulfophenyl)benzylidene]-2,5-cyclohexadien-1-ylidene](m-sulfobenzyl)ammonium hydroxide inner salt with smaller amounts of the isomeric disodium salts of ethyl[4-[p-[ethyl(p-sulfobenzyl)amino]-α-(o-sulfophenyl)benzylidene]-2,5-cyclohexadien-1-ylidene](p-sulfobenzyl) ammonium hydroxide inner salt and ethyl[4-[p-[ethyl(o-sulfobenzyl)amino]-α-(o-sulfophenyl)benzylidene]-2,5-cyclohexadien-1-ylidene](o-sulfobenzyl) ammonium hydroxide inner salt.

FD&C Blue No. 2

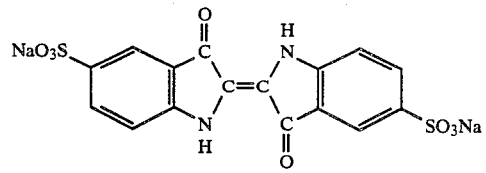

Principally the disodium salt of 2-(1,3-dihydro-3-oxo-5-sulfo-2H-indol-2-ylidene)-2,3-dihydro-3-oxo-1H-indole-5-sulfonic acid (CAS Reg. No. 860-22-0) with smaller amounts of the disodium salt of 2-(1,3-dihydro-3-oxo-7-sulfo-2H-indol-2-ylidene)-2,3-dihydro-dihydro-3-oxo-1H-indole-5-sulfonic acid (CAS Reg. No. 54947-75-0) and the sodium salt of 2-(1,3-dihydro-3-oxo-2H-indol-2-ylidene)-2,3-dihydro-3-oxo-1H-indole-5-sulfonic acid (CAS Reg. No. 605-18-5).

D&C Violet No. 2

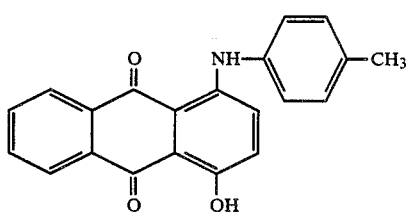

Principally 1-hydroxy-4-[(4-methylphenyl)amino]-9,10-anthracenedione.

Ext. D&C Violet No. 2

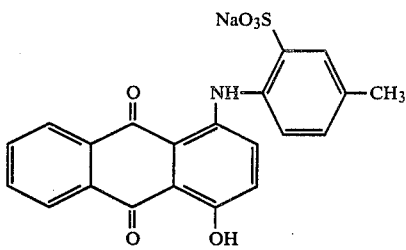

Principally the monosodium salt of 2-[(9,10-dihydro-4-hydropxy-9,10-dioxo-1-anthracenyl)amino]-5-methyl-benzesulfonic acid.

D&C Red. No. 17

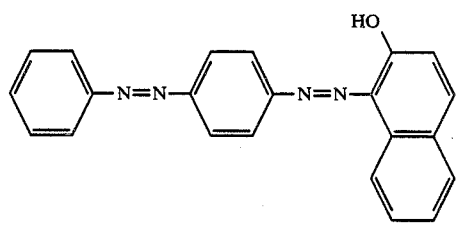

Principally 1-[[4-(phenylazo)phenyl]azo]-2-naphthalenol.

Each of the samples of ATG containing a dye or compound identified in Table I were milled into a standard resin blank. For this purpose, 1.2 grams of ATG containing about 0.05% of the additive identified in Table I were milled into the resin blank. The milling procedure for all examples of a blank resin formula with and without additives involved 5 minutes at about 350° F. to form a uniform polyvinylchloride composition, after which longer anti-staining activity was determined by oven treatment at 390° F. at a 2 minute interval observation of test samples as indicated. The anti-staining contributions of each of the additives of Table I compared to a blank were then observed.

ANTI-STAINING ACTIVITY STANDARD FORMULATION

Examples 1–16

In this series of examples, the anti-staining activity of the additive of this invention is evidenced. For purposes of these examples, the standard blank formula was employed with R-101 type $TiO_2$ pigment which is a non-staining pigment. Therefore, these examples were intended to typify the standard formula situation where normal staining activity of an antimony heat stabilizer may be observed in the blank for comparison with formulas with certain additives. The ATG contained a specific dye or compound as identified hereinafter in each example. The additive was first added to the ATG in an amount of about 0.05% of the ATG as stated above. The ATG containing the additive was then compounded into the standard blank according to the procedure described above. The results are reported in Table II.

TABLE II

| Example 1 | Aakash FD&C Blue No. 1 | Slight staining evidenced off the mill with increasing intensity through 20 minutes |
|---|---|---|
| Example 2 | Aakash FD&C Blue No. 2 | Slight staining evidenced off the mill with increasing intensity through 20 minutes |
| Example 3 | Aakash Violet No. 2 | No staining is evidenced until about 10–14 minutes of heating at 390° F. |
| Example 4 | Colorcon FD&C Blue No. 2 | Slight staining evidenced off the mill with increasing intensity through 20 minutes |
| Example 5 | Crompton FD&C Blue No. 1 | Slight staining evidenced off the mill with increasing intensity through 20 minutes |
| Example 6 | Crompton FD&C Blue No. 2 | Slight staining evidenced off the mill with increasing intensity through 20 minutes |
| Example 7 | Crompton Ext. FD&C Violet No. 2 | Slight staining evidenced off the mill with increasing intensity through 20 minutes |
| Example 8 | I.T.C. Blue No. 1 | Slight staining evidenced off the mill with increasing intensity through 20 minutes |
| Example 9 | I.T.C. Blue No. 2 | Slight staining evidenced off the mill with increasing intensity through 20 minutes |
| Example 10 | Hkohnstamm Ext. D&C Violet No. 2 | Slight staining evidenced off the mill with increasing intensity through 20 minutes |
| Example 11 | Pylam D&C Violet No. 2 | No staining is evidenced until about 10–14 minutes of heating at 390° F. |
| Example 12 | Pylam D&C Red. No. 17 | Slight staining evidenced off the mill with increasing intensity through 20 minutes |
| Example 13 | Anthraquinone | Slight staining evidenced off the mill with increasing intensity through 20 minutes |
| Example 14 | Quinazarin | Slight staining evidenced off the mill with increasing intensity through 20 minutes |
| Example 15 | Calco Oil Violet ZIRS (D&C Violet No. 2) | No staining is evidenced until about 10–14 minutes of heating at 390° F. |
| Example 16 | No additive | Slight staining evidenced off the mill with increasing intensity through 20 minutes |

With reference to Table II, it will be observed that when a D&C Violet No. 2 dye was employed, which was soluble with the ATG, particularly from the class of hydroxy arylaminoanthraquinones, that the desired results of this invention were achieved. In the case of Examples 3, 11 and 15, with a D&C Violet No. 2 dye there was no staining evident until afer about 10–14 minutes of heating at 390° F. In contrast, with all the other dyes, even though perhaps quite similar chemically, or having deep blue or violet colors, slight staining was observed off the mill. Thus, for the standard formula involving a titanium dioxide pigment of the R-101 type, Examples 1–16 demonstrated that the anti-staining additive of this invention eliminates or prevents staining otherwise evident in the blank of Example 16 wherein no additive was present. In the case of Examples 13 and 14, it was observed that the anthraquinone structure did not contribute any anti-staining activity to the standard formulation involving R-101 titanium dioxide. Furthermore, the quinazarin structure did not prevent staining. Rather, it was only the hydroxy arylaminoanthraquinone structure of Examples 3, 11 and 15 which inhibited staining. Quite unexpectedly, in the case of Example 10 which involved the use of EXT. ples 19, 27 and 31. The results are reported in Table III.

TABLE III

| | | |
|---|---|---|
| Example 17 | Aakash FD&C Blue No. 1 | Slight staining evidenced off the mill with increasing intensity through 20 minutes |
| Example 18 | Aakash FD&C Blue No. 2 | Slight staining evidenced off the mill with increasing intensity through 20 minutes |
| Example 19 | Aakash Violet No. 2 | No staining is evidenced until about 10–14 minutes of heating at 390° F. |
| Example 20 | Colorcon FD&C Blue No. 2 | Slight staining evidenced off the mill with increasing intensity through 20 minutes |
| Example 21 | Crompton FD&C Blue No. 1 | Slight staining evidenced off the mill with increasing intensity through 20 minutes |
| Example 22 | Crompton FD&C Blue No. 2 | Slight staining evidenced off the mill with increasing intensity through 20 minutes |
| Example 23 | Crompton Ext. FD&C Violet No. 2 | Slight staining evidenced off the mill with increasing intensity through 20 minutes |
| Example 24 | I.T.C. Blue No. 1 | Slight staining evidenced off the mill with increasing intensity through 20 minutes |
| Example 25 | I.T.C. Blue No. 2 | Slight staining evidenced off the mill with increasing intensity through 20 minutes |
| Example 26 | Hkohnstamm Ext. D&C Violet No. 2 | Slight staining evidenced off the mill with increasing intensity through 20 minutes |
| Example 27 | Pylam D&C Violet No. 2 | No staining is evidenced until about 10–14 minutes of heating at 390° F. |
| Example 28 | Pylam D&C Red. No. 17 | Slight staining evidenced off the mill with increasing intensity through 20 minutes |
| Example 29 | Anthraquinone | Slight staining evidenced off the mill with increasing intensity through 20 minutes |
| Example 30 | Quinazarin | Slight staining evidenced off the mill with increasing intensity through 20 minutes |
| Example 31 | Calco Oil Violet ZIRS (D&C Violet No. 2) | No staining is evidenced until about 10–14 minutes of heating at 390° F. |
| Example 32 | No additive | Slight staining evidenced off the mill with increasing intensity through 20 minutes |

D&C Violet No. 2 which is a sodium salt of the sulfonate of D&C Violet No. 2, anti-staining activity was not observed. Therefore, the results of this series of examples are considered to be quite surprising and unobvious to a person of ordinary skill in the art. One would not expect the different and unique results in accordance with the principles of this invention in terms of anti-staining activity by simple comparison of colors of the dye or additives. Furthermore, the activity cannot be anticipated on the basis of chemical structure. Nevertheless, the anti-staining activity was achieved with the particular class of hydroxy arylaminoanthraquinones exemplified by 1-hydroxy-4-[(4-methylphenyl)amino]-9,10-anthracenedione as an anti-staining additive of this invention.

ANTI-STAINING ACTIVITY IN TIN CROSS-STAINING FORMULATIONS

In this series of examples, a standard blank including the additives of previous Examples 1–16 were employed except that there was added 0.3 gram of an organotin compound, namely, TM694 (a sulfur bridge tin) which is known to cross-stain with the ATG. The results of staining and anti-staining activity are essentially confirmed when the hydroxy arylaminoanthraquinone additive of this invention was employed in Exam- With reference to Table III, it will be observed that when a D&C Violet No. 2 dye was employed, which was soluble with the ATG, particularly from the class of hydroxy arylaminoanthraquinones, that the desired effects of this invention were achieved. In the case of Examples 19, 27 and 31, there was no staining evident until after about 10–14 minutes of heating at 390° F. In contrast, with all the other dyes or additives, slight staining was observed off the mill. Thus, for the standard formula including a cross-staining tin compound, Examples 17–30 demonstrate that the anti-staining additive of this invention eliminates staining otherwise evident from cross-staining in Example 32 wherein no additive was present. In the case of Examples 29 and 30, it was observed that the anthraquinone structure did not contribute any anti-staining activity. Furthermore, the quinazarin structure did not prevent staining. Rather, it was only the hydroxy arylaminoanthraquinone structure of Examples 19, 27 and 31 which inhibited staining. Again, in the case of Example 26 which involved the use of EXT. D&C Violet No. 2, which is a sodium salt of the sulfonate of D&C Violet No. 2, anti-staining activity was not observed. Therefore, the results of this invention were considered to be quite surprising and unobvious to a person of ordinary skill in the art.

ANTI-STAINING ACTIVITY IN TITANIUM DIOXIDE STAINING FORMULATIONS

In this series of Examples 33-48, the standard formulation and additives employed in connection with previous examples were repeated except that employed in the standard blank resin was a HiTox titanium dioxide pigment which is known to cause staining with ATG. Therefore, all conditions of Examples 33-48 were identical to Examples 1-16 except that the HiTox titanium dioxide pigment which was known to cause staining was substituted for R-101 $TiO_2$ which does not cause staining in a standard formulation. The results are reported in Table IV.

TABLE IV

| Example 33 | Aakash FD&C Blue No. 1 | Slight staining evidenced off the mill with increasing intensity through 20 minutes |
|---|---|---|
| Example 34 | Aakash FD&C Blue No. 2 | Slight staining evidenced off the mill with increasing intensity through 20 minutes |
| Example 35 | Aakash Violet No. 2 | No staining is evidenced until about 10-14 minutes of heating at 390° F. |
| Example 36 | Colorcon FD&C Blue No. 2 | Slight staining evidenced off the mill with increasing intensity through 20 minutes |
| Example 37 | Crompton FD&C Blue No. 1 | Slight staining evidenced off the mill with increasing intensity through 20 minutes |
| Example 38 | Crompton FD&C Blue No. 2 | Slight staining evidenced off the mill with increasing intensity through 20 minutes |
| Example 39 | Crompton Ext. FD&C Violet No. 2 | Slight staining evidenced off the mill with increasing intensity through 20 minutes |
| Example 40 | I.T.C. Blue No. 1 | Slight staining evidenced off the mill with increasing intensity through 20 minutes |
| Example 41 | I.T.C. Blue No. 2 | Slight staining evidenced off the mill with increasing intensity through 20 minutes |
| Example 42 | Hkohnstamm Ext. D&C Violet No. 2 | Slight staining evidenced off the mill with increasing intensity through 20 minutes |
| Example 43 | Pylam D&C Violet No. 2 | No staining is evidenced until about 10-14 minutes of heating at 390° F. |
| Example 44 | Pylam D&C Red. No. 17 | Slight staining evidenced off the mill with increasing intensity through 20 minutes |
| Example 45 | Anthraquinone | Slight staining evidenced off the mill with increasing intensity through 20 minutes |
| Example 46 | Quinazarin | Slight staining evidenced off the mill with increasing intensity through 20 minutes |
| Example 47 | Calco Oil Violet ZIRS (D&C Violet No. 2) | No staining is evidenced until about 10-14 minutes of heating at 390° F. |
| Example 48 | No additive | Slight staining evidenced off the mill with increasing intensity through 20 minutes |

With reference to Table IV, it will be observed that when a D&C Violet dye No. 2 was employed, which was soluble with the ATG, particularly from the class of hydroxy arylaminoanthraquinones, that the desired effects of this invention were achieved. In the case of Examples 35, 43 and 47, there was no staining evident until after about 10-14 minutes of heating at 390° F. In contrast, with all the other dyes or additives, slight staining was observed off the mill. Thus, for the standard formula involving a staining titanium dioxide pigment, Examples 33-48 demonstrate that the anti-staining additive of this invention eliminated staining otherwise evident in Example 48 wherein no additive was present. These results are consistent with Examples 1-32. Therefore, the results of this invention are considered to be quite surprising and unobvious to a person of ordinary skill in the art. A particular class of chemical structures or dyes has been found to be effective in inhibiting or diminishing the various causes of staining associated with antimony stabilizers in vinyl halide resins.

ANTI-STAINING ACTIVITY AGAINST ULTRA VIOLET LIGHT

In the following Examples 49 and 50, two standard resin formulas were employed, each respectively containing 1 total part and 0.37 part by weight of the liquid ATG. To each of these standard blanks were added 1 part of $TiO_2$ (R-101), 5 parts calcium carbonate, 0.8 part calcium stearate, 1.2 parts of 165° wax and 0.2 part of polyethylene wax. For comparison purposes, 0.05% Calco oil violet ZIRS (D&C Violet No. 2) was added to the ATG of each of the standard blank formulas with slight heating to about 160° F. as represented by Examples 51 and 52. For further comparative purposes 0.037% by weight of the D&C Violet No. 2 was added to the ATG and these were reported by Examples 53-54. The formulas of Examples 49-54 were milled under identical conditions on a 2 roll mill at 350° F. for 5 minutes. The milled sheets of polyvinyl chlodride were then cut into plaques and placed in the UVCON and their anti-staining resistance to ultraviolet light was determined. The procedure employed was the AN- SI/ASTM G 53 - 77 standard recommended practice for operating light- and water-exposure apparatus (fluorescent UV-condensation type) for exposure of nonmetallic materials. The cycle times employed were 4 hours of light and 4 hours of condensation with a 30 minutes preheat cycle according to said ANSI/ASTM method. The plaques were left in the UVCON for 40 hours and the following observations were made. Those plaques containing the ATG with anti-staining additive at the level of 0.037% or 0.05% resisted ultraviolet staining in comparison to the blank formulas containing no antistaining additive. It also appeared that the anti-staining additive at a level of 0.037% in the ATG looked better than the samples containing the anti-staining additive at a level of 0.05%. This series of examples, therefore, illustrates that the anti-staining antimony compositions of this invention may be employed to overcome the ultraviolet light staining of molded PVC articles.

OTHER EXAMPLES OF ANOTHER ORGANIC VIOLET DYE

Procedures substantially in accord with above examples may be employed for crystal violet in essentially the same amounts in the antimony stabilizer compositions as the anti-staining additive with essentially the same results. Accordingly, in its broad aspects, this invention is directed to an organic violet dye as the anti-staining additive for antimony organic sulfur-containing compositions, especially for use in vinyl halide resin stabilizer compositions.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adoptedt to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C=CHCl$ to polyvinyl chloride $(CH_2-CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymer, vinyl chloride-vinylidene copolymers vinyl chloride-propylene copolymers; and the like. Of course, the vinyl halide commonly used in the industry is the chloride, although others such as bromide and fluoride may beused. Examples of the latter polymers include polyvinyl bromide, polyvinyl fluoride, and copolymers thereof.

It is also to be understood that other components such as lubricants, processing aids, plasticizers, fillers, pigments, other stabilizers, other non-halogenated resins, etc., can be incorporated in the resin compositions and the benefits of this invention can be achieved. Accordingly, other modifications will become apparent in view of the teachings herein without departing from the true spirit and scope of this invention.

What is claimed is:

1. A stain-resistant antimony organic sulfur-containing composition consisting essentially of;
   an antimony organic sulfur-containing compound have the formula:

$R_nSbX_{3-n}$ where R of the formula is selected from the group consisting of alkyl, alkenyl, alkynyl, aryl, cycloalkyl, cycloalkenyl, mixed aryl-alkyl, and subttituted groups thereof, where X of the formul,a is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof, where n is an integer of 0 to 2, and
   as an anti-staining additive therefor in an effective amount an organic violet dye, with the proviso that said dye is other than the monosodium salt of 2-? (9,10-dihydro-4-hydroxy-9,10-dioxo-1-anthracenyl)amino? -5-methylbenzesulfonic acid.

2. The composition of claim 1 wherein said dye is an hydroxy arylaminoanthraquinone.

3. The composition of claim 1 wherein said dye is crystal violet.

4. The composition of claim 1 wherein said dye is contained in an amount of from about 0.02 to about 0.10% by weight of said antimony composition.

5. The composition of claim 1 which is liquid and shelf stable at ambient temperatures.

6. The composition of claim 1 wherein said antimony compound is selected from the group consisting of antimony tris(isooctylthioglycolate), antimony tris(isooctylmercaptopropionate), dodecylmercaptoantimony bis(isooctylthioglycolate), antimony tris(glycoldimercaptoacetate), and mixtures thereof.

7. The composition of claim 6 wherein said antimony composition additionally contains a phenol.

8. The composition of claim 7 wherein said phenol is selected from the group consisting of monohydric, dihydric and trihydric phenols, and mixtures thereof.

9. The composition of claim 7 wherein said phenol is selected from the group consisting of orthodihydricphenols and orthodihydricalkylphenols, and mixtures thereof.

10. The composition of claim 7 wherein said phenol is 2,6-di-t-butyl-4-methyl phenol.

11. The composition of claim 7 wherein said phenol is t-butylcatechol.

12. A stain-resistant liquid antimony composition which is shelf-stable at room conditions for at least several weeks consisting essentially of:
    a normally liquid antimony organic sulfur-containing compund having the formula

$R_nSbX_{3-n}$ wherein R of the formula is selected from the group consisting of alkyl, alkenyl, alkynyl, aryl, cycloalkyl, cycloalkenyl, mixed aryl-alkyl, and substituted groups thereof, where X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof and where n is an integer of 0 to 2, and as an anti-staining additive therefor in an effective amount an organic violet dye, with the provisio that said dye is other than the monosodium salt of 2-?  (9,10-dihydro-4-hydroxy-9,10-dioxo-1-anthracenyl)amino? -5-methylbezesulfonic acid.

13. The composition of claim 12 wherein said dye is contained in an amount of from about 0.02 to about 0.10% by weight of said antimony composition.

14. The composition of claim 13 wherein said dye is contained in an amount of from about 0.03 to about 0.05% by weight of said antimony composition.

15. The composition of claim 12 wherein said dye is an hydroxy arylaminoanthraquinone.

16. The composition of claim 12 wherein said dye is crystal violet.

17. The composition of claim 12 wherein said antimony compound is selected from the group consisting of antimony tris(isoocylthioglycolate), antimony tris-(isooctylmercaptopropionate), dodecylmercaptoantimony bis(isooctylthioglycolate), antimony tris(glycoldimercaptoacetate), and mixtures thereof.

18. The composition of claim 17 wherein said anti-staining additive is crystal violet.

19. The composition of claim 18 wherein the amount of said anti-staining additive is from about 0.03 to about 0.05% by weight.

20. A vinyl halide resin composition which comprises a vinylchoride resin and, as an anti-staining heat stabilizer, an effective amount of a composition consisting essentially of, an antimony orgainc sulfur-containing compound having the formula $$R_nSbX_{3-n}$$

where R of the formula is selected from the group consisting of alkyl, alkenyl, alkynyl, aryl, cycloalkyl, cycloalkenyl, mixed aryl-alkyl, and substituted groups thereof, wherein X of the formula is selected form the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof, and where n is an integer of 0 ot 2, and as an anti-staining additive therefor in an effective amount an organic violet dye, with the provisio that said dye is other than the monosodium salt of 2-? (9,10-dihydro-4-hydroxy-9,10-dioxo-1-anthracenyl)amino? -5-methylbenzesulfonic acid.

21. The composition of claim 20 wherein said dye is an hydroxy arylaminoanthraquinone.

22. The composition of claim 20 wherein said dye is crystal violet.

23. The composition of claim 22 wherein said dye is contained in an amount of from about 0.02 to about 0.10% by weight of said antimony composition.

24. The composition of claim 20 which is liquid and shelf stable at ambient temperatures.

25. The composition of claim 20 wherein said antimony compound is selected from the group consisting of antimony tris(isoocylthioglycolate), antimony tris-(isooctylmercaptopropionate), dodecylmercaptoantimony bis(isooctylthioglycolate), antimony tris(glycoldimercaptoacetate), and mixtures thereof.

26. The composition of claim 25 wherein said phenol is t-butylcatechol.

27. The composition of claim 25 wherein said phenol is 2,6-di-t-butyl-4-methyl phenol.

28. The composition of claim 20 wherein said vinyl halide resin comprises polyvinylchloride.

29. The composition of claim 20 wherein the relative amount of said antimony compound is from about 0.5 to about 5 parts by weight per 100 parts by weight resin and the anti-staining additive is present from about 0.03 to about 0.05% by weight of said antimony compound.

30. The composition of claim 29 wherein catechol is present in an amount from about 1 to about 10% by weight of said antimony compound.

31. A stain-resistant liquid antimony composition which is shelf-stable at room conditions for at least several weeks consisting essentially of a normally liquid antimony organic sulfur-containing compound selected from the group consisting of antimony tris(isooctylthioglycolate), antimony tris-(isooctylmercaptopropionate), dodecylmercaptoantimony bis(isooctylthioglycolate), antimony tris(glycoldimercaptoacetate), and mixtures thereof, as an anti-staining additive therefor in an effective amount crystal violet, and t-butyl catechol.

32. The composition of claim 31 wherein said anti-staining additive is present in an amount of from about 0.03 to about 0.05% by weight of said antimony compound and said t-butyl catechol is present in an amount of from about 1 to about 10% by weight of said antimony compound.

* * * * *